US008771880B2

(12) United States Patent
Fukui et al.

(10) Patent No.: US 8,771,880 B2
(45) Date of Patent: *Jul. 8, 2014

(54) BINDER FOR SEPARATOR OF NON-AQUEOUS ELECTROLYTE BATTERY COMPRISING 2-CYANOETHYL GROUP-CONTAINING POLYMER AND SEPARATOR AND BATTERY USING THE SAME

(75) Inventors: Ikuo Fukui, Joetsu (JP); Kazuhisa Hayakawa, Joetsu (JP); Soji Tanioka, Tokyo (JP); Masahiro Ohgata, Osaka (JP); Masaaki Kajitani, Osaka (JP)

(73) Assignees: Shin-Etsu Chemical Co., Ltd., Tokyo (JP); Matsugaki Chemical Industries Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/430,818

(22) Filed: Mar. 27, 2012

(65) Prior Publication Data

US 2012/0258350 A1   Oct. 11, 2012

(30) Foreign Application Priority Data

Apr. 5, 2011   (JP) .................................. 2011-084067

(51) Int. Cl.
*H01M 10/056*   (2010.01)
*H01M 2/16*   (2006.01)

(52) U.S. Cl.
USPC .......................................... 429/251; 429/249

(58) Field of Classification Search
USPC .................................................. 429/249, 251
See application file for complete search history.

(56) References Cited

U.S. PATENT DOCUMENTS

| | | | |
|---|---|---|---|
| 2,332,049 A | 10/1943 | Bock et al. | |
| 4,322,524 A | 3/1982 | Onda et al. | |
| 5,869,732 A | 2/1999 | Nishikawa et al. | |
| 2006/0008700 A1 | 1/2006 | Yong et al. | |
| 2007/0054184 A1* | 3/2007 | Yong et al. | 429/144 |
| 2008/0292968 A1 | 11/2008 | Lee et al. | |
| 2008/0311481 A1* | 12/2008 | Kim et al. | 429/342 |
| 2010/0316903 A1 | 12/2010 | Kim et al. | |
| 2011/0064988 A1 | 3/2011 | Yu | |
| 2012/0258348 A1* | 10/2012 | Hayakawa et al. | 429/144 |
| 2012/0258349 A1* | 10/2012 | Hayakawa et al. | 429/144 |
| 2012/0259067 A1* | 10/2012 | Fukui et al. | 525/59 |

FOREIGN PATENT DOCUMENTS

| | | |
|---|---|---|
| JP | 59226001 A | 12/1984 |
| JP | 4357695 A | 12/1992 |
| JP | 5178903 A | 7/1993 |
| JP | 2010-15917 A | 1/2010 |
| JP | 2010-50076 A | 3/2010 |
| KR | 20110129203 | 12/2011 |
| WO | WO 2006/004366 A1 | 1/2006 |
| WO | WO 2006/068428 A1 | 6/2006 |
| WO | WO 2007/066967 A1 | 6/2007 |
| WO | WO 2008/097013 A1 | 8/2008 |
| WO | WO 2008/108583 A1 | 9/2008 |
| WO | WO 2009/014388 A2 | 1/2009 |
| WO | WO 2009/066916 A2 | 5/2009 |
| WO | WO 2009/069928 A2 | 6/2009 |
| WO | WO 2009/110726 A2 | 9/2009 |

OTHER PUBLICATIONS

Li et al. "Synthesis and Hydrolysis of β-Cyanoethyl Ether of Poly-(vinyl alcohol)", *Journal of Applied Polymer Sciences* 73:2771-2777 (1999).
European Search Report corresponding to European Application No. 12162573.5 dated Jun. 14, 2012.
European Search Report corresponding to European Application No. 12162563.6 dated Jun. 12, 2012.
Extended European Search Report corresponding to European Application No. 12162588.3 dated Jul. 26, 2012.
Tsutsumi et al. "High ionic conductive behavior of cyanoethylated polyvinylalcohol- and polyacrylonitrile-based electrolytes", *Solid State Ionics* 177:2683-2686 (2006).
Supplementary European Search Report corresponding to European Application No. 12162579.2 dated May 29, 2012.

* cited by examiner

*Primary Examiner* — Ula C Ruddock
*Assistant Examiner* — Frank Chernow
(74) *Attorney, Agent, or Firm* — Myers Bigel Sibley & Sajovec, P.A.

(57) ABSTRACT

Object of the invention is to provide a binder for a separator which can be comprised by a non-aqueous electrolyte battery with improved battery properties and heat resistance; the separator comprising the binder; and the non-aqueous electrolyte battery comprising the separator. More specifically, provided is a binder for a separator of a non-aqueous electrolyte battery, the separator comprising a 2-cyanoethyl group-containing polymer having bis-cyanoethyl ether content of 0.5% by weight or less as an impurity.

8 Claims, No Drawings

BINDER FOR SEPARATOR OF NON-AQUEOUS ELECTROLYTE BATTERY COMPRISING 2-CYANOETHYL GROUP-CONTAINING POLYMER AND SEPARATOR AND BATTERY USING THE SAME

RELATED APPLICATION

This application claims priority from Japanese Patent Application No. 2011-084067, filed Apr. 5, 2011, the disclosure of which is incorporated by reference herein in its entirety.

BACKGROUND OF THE INVENTION

The present invention relates to a separator of a battery, the separator comprising a porous substrate and a heat-resistant porous layer, wherein the separator comprises a 2-cyanoethyl group-containing polymer having the content of specified impurity limited to a certain value or below as a binder in the heat-resistant porous layer; and a non-aqueous electrolyte battery with improved heat resistance and improved battery properties by using the separator for a battery.

Recently, as a power source for a mobile terminal such as that of a notebook computer or a cellular phone or as a power source for a hybrid car or an electric car, a non-aqueous electrolyte battery with high voltage and high energy density, in particular a lithium ion secondary battery, is getting the attention.

The non-aqueous electrolyte battery typified by a lithium ion secondary battery has high capacity and high energy density so that a large electric current flows at the time of internal short circuit or external short circuit of the battery. Thus, there is a problem that heat is generated in the battery due to Joule heat caused by short circuit, the battery is swelled due to gas generation accompanied with decomposition of an electrolyte solution, and properties of the battery are deteriorated.

According to a current lithium ion secondary battery, in order to resolve such a problem, a separator comprising a porous substrate having fine pores such as a polypropylene or polyethylene film is interposed between a negative electrode and a positive electrode. When the temperature increases owing to the heat generated by short circuit, the separator comprising the porous substrate melts to block the pores. As a result, movement of ions is inhibited so that the current does not flow and runaway of the battery is suppressed.

Because of wider use of a lithium ion secondary battery, a battery having higher heat resistance, in particular improved heat resistance at the time of internal short circuit has been currently required.

When the internal short circuit occurs, it is believed that the temperature increases to 600° C. or higher at the short circuit region owing to local heat generation. Thus, in a conventional separator comprising a porous substrate having fine pores such as a polyolefin film, the separator is shrunken or melted by heat generated by the short circuit at the short circuit region so that the battery is exposed to dangers of fuming, ignition and explosion.

As a method for preventing the short circuit caused by heat shrinkage or heat melting of a separator and improving reliability of a battery, a multilayer separator comprising a heat-resistant porous layer on one or both surfaces (i.e., frond and back surfaces) of a porous substrate having fine pores such as a polyethylene film is suggested (JP 2010-015917A; JP 2009-518809T, which is a National Phase Publication of WO 2007/066967; JP 2008-503049T, which a National Phase Publication of WO 2006/004366; and JA 2010-50076A). It is also disclosed that a 2-cyanoethyl group-containing polymer is used as a binder in a heat-resistant porous layer (JP 2009-518809T and JP 2008-503049T).

It is also disclosed that a 2-cyanoethyl group-containing polymer is used for a binder in the heat-resistant porous layer comprised by a separator (JP 2009-518809T and JP 2008-503049T, which are national phase publications of WO 2007/066967 and WO 2006/004366, respectively).

SUMMARY OF THE INVENTION

However, even for a separator comprising a 2-cynaoethyl group-containing polymer as a binder in a heat-resistant layer, further improvement for enhancing the heat resistance of the heat-resistant porous layer is still required.

The invention has been completed under the above circumstances. The object of the invention is to provide a binder for a separator which can be comprised by a non-aqueous electrolyte battery with improved battery properties and heat resistance; the separator comprising the binder; and the non-aqueous electrolyte battery comprising the separator.

As a result of intensive studies, the present inventors have found that bis-cyanoethyl ether present in a 2-cyanoethyl group-containing polymer has a bad influence on heat resistance of a separator of a non-aqueous electrolyte battery; and a binder comprising a 2-cyanoethyl group-containing polymer having an certain amount or less of bis-cyanoethyl ether as an impurity can provide a separator having sufficient adhesion among inorganic filler particles in a heat-resistant porous layer even in an electrolyte solution, and having excellent mechanical strength of a heat-resistant porous layer and favorable ion conductivity. The invention has been completed based on the finding.

According to the invention, there is provided a binder for a separator of a non-aqueous electrolyte battery comprising a 2-cyanoethyl group-containing polymer having bis-cyanoethyl ether content of 0.5% by weight or less as an impurity.

According to the invention, provided are a binder for a separator which can produce a non-aqueous electrolyte battery with excellent battery properties and heat resistance; the separator comprising the binder; and the non-aqueous electrolyte battery comprising the separator.

DETAILED DESCRIPTION OF THE PREFERRED EMBODIMENTS

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. Unless otherwise defined, all technical and scientific terms used herein have the same meaning as commonly understood by one of ordinary skill in the art to which this invention belongs. All references cited are incorporated herein by reference in their entirety.

According to the invention, as a binder for a separator of a non-aqueous electrolyte battery, a 2-cyanoethyl group-containing polymer having bis-cyanoethyl ether content of 0.5% by weight or less, preferably 0.4% by weight or less is used. The bis-cyanoethyl ether is an impurity. The bis-cyanoethyl ether content can be measured by using a gas chromatography apparatus. Bis-cyanoethyl ether ($NCCHCH_2O$—$CH_2CHCN$) is a by-product which is a product of the reaction between acrylonitrile and cyanohydrin ($HOCH_2CHCN$), which is also a by-product of the reaction between acrylonitrile and water present in a reaction system. When the bis-cyanoethyl ether content is more than 0.5% by weight, bis-cyanoethyl ether present in the 2-cyanoethyl group-containing polymer is dissolved into an electrolyte solution to lower the mechanical strength of the heat-resistant porous layer in the separator, and as a result, the heat resistance is lowered. In addition, as the permittivity of the binder is lowered to reduce the ion conductivity of the separator so that there is a problem of deteriorated load characteristics of the battery. Thus, when a 2-cyanoethyl group-containing polymer having bis-cyanoethyl ether content of 0.5% by weight or less is used as a binder of a heat-resistant porous layer, a separator for a non-aqueous electrolyte battery having excellent mechanical strength and excellent ion conductivity can be obtained.

The 2-cyanoethyl group-containing polymer can be produced, for example, by Michael addition between acrylonitrile and a polymer having a hydroxyl group in the molecule thereof as described in the following reaction formula:

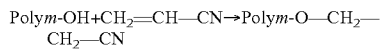

$$\text{Poly}m\text{-OH} + CH_2\!=\!CH\!-\!CN \rightarrow \text{Poly}m\text{-O}\!-\!CH_2\!-\!CH_2\!-\!CN$$

wherein Polym-OH represents a hydroxyl group-containing polymer and Polym—O—$CH_2$—$CH_2$—CN represents a 2-cyanoethyl group-containing polymer.

In other words, the 2-cyanoethyl group-containing polymer (Polym-O—$CH_2$—$CH_2$—CN) is a polymer in which hydrogen of the hydroxyl group in a hydroxyl group-containing polymer (Polym-OH) has been replaced by a cyanoethyl group (—$CH_2$—$CH_2$—CN).

The 2-cyanoethyl group-containing polymer is produced, for example, by a method comprising the following steps. A polymer containing a hydroxyl group in the molecule thereof is mixed in water until the hydroxyl group-containing polymer is homogeneously dissolved. A catalyst such as caustic soda or sodium carbonate is added to and mixed in the aqueous solution of the hydroxyl group-containing polymer until the resulting mixture becomes homogeneous. Further, acrylonitrile is added thereto and the reaction is carried out at 0 to 60° C. for 2 to 12 hours. Such a later addition of the catalyst such as caustic soda or sodium carbonate allows the reaction between the hydroxyl group-containing polymer and acrylonitrile to be promoted, and as a result, a side reaction for producing the bis-cyanoethyl ether from acrylonitrile can be inhibited. On the other hand, in the method in which a catalyst such as caustic soda or sodium carbonate is dissolved in water at first, and then polyvinyl alcohol is dissolved in the catalyst solution, followed by addition of acrylonitrile for the reaction, a great amount of bis-cyanoethyl ether is generated as a by-product. Thus, it is difficult to obtain a product having bis-cyanoethyl ether content of 0.5% by weight or less. Although acrylonitrile functions also as a solvent, a dilution solvent such as isopropyl alcohol, methyl ethyl ketone, acetone or the other solvent which does not react with acrylonitrile may be optionally added. When the reaction is over, the reaction solution is separated into two phases of an aqueous phase and an organic phase containing the 2-cyanoethyl group-containing polymer. The organic layer is collected and then water is added thereto to allow a crude product to precipitate. The crude product is washed with a great amount of water or repeatedly subjected to re-dissolution/re-precipitation. As a result, 2-cyanoethyl group-containing polymer having bis-cyanoethyl ether content of 0.5% by weight or less can be obtained. It should be noted that the below-mentioned metal salts present inside of a rice cake-like 2-cyanoethyl group-containing polymer such as cyanoethyl polyvinyl alcohol may remain as impurities in a great amount and may not be reduced to the specified amount, unless it is washed with water having temperature of higher than 30° C. The step of washing preferably comprises washing, with warm or hot water, for example, one to five times and one to five cycles of re-dissolution/re-precipitation. The water used for washing preferably has temperature of 30 to 80° C.

Examples of the 2-cyanoethyl group-containing polymer include cyanoehtyl polysaccharides such as cyanoethyl pullulan, cyanoethyl cellulose, cyanoethyl dihydroxypropyl pullulan, cyanoethyl hydroxyethyl cellulose, cyanoethyl hydroxypropyl cellulose and cyanoethyl starch; and cyanoethyl polyvinyl alcohol. In particular, cyanoethyl polyvinyl alcohol is preferable. Since cyanoethyl polyvinyl alcohol is a binder which can form strong adhesion among inorganic filler particles and has flexibility, problems such as cracking do not easily occur when the separator is bent or folded.

The ratio of replacement by cyanoethyl groups in the 2-cyanoethyl group-containing polymer is preferably 30% or more, particularly preferably 40% or more. When the ratio of replacement by cyanoethyl groups is less than 30%, the permittivity may be lowered so that sufficient ion conductivity may not obtained, and solvent solubility may be lowered so that as a viscosity of a slurry used for forming a heat-resistant porous layer may become low and dripping may occur when a surface of a porous substrate is coated with the slurry.

The ratio of replacement by cyanoethyl groups can be represented by the ratio (%) of mole number of hydroxyl groups replaced by cyanoethyl groups to mole number of hydroxyl groups per monomer unit for the hydroxyl group-containing polymer which is a starting raw material. The ratio of replacement by cyanoethyl groups in the 2-cyanoethyl group-containing polymer can be calculated based on the nitrogen content measured by Kjeldahl method. The ratio of replacement by cyanoethyl groups can be adjusted to 30% or more by the later addition of the aqueous solution of a catalyst such as caustic soda in the process for producing the cyanoethyl group-containing polymer. The viscosity (at 20° C.) of a 20% by weight 2-cyanoethyl group-containing polymer solution in which 2-cyanoethyl group-containing polymer has been dissolved in N,N-dimethylformamide is preferably 150 to 500 mPa·s, particularly preferably 200 to 400 mPa·s. When the viscosity is lower than 150 mPa·s, a viscosity of the slurry used for forming a heat-resistant porous layer may become low so that large dripping may occur when a surface of a porous substrate is coated with the slurry. When the viscosity is higher than 500 mPa·s, a viscosity of the slurry may become excessively large so that it may be difficult to coat a surface of a porous substrate with the slurry.

Content of the metal salts which are present in the 2-cyanoethyl group-containing polymer is preferably 50 ppm or less, particularly preferably 20 ppm or less in total when the content of metal salts is calculated based on content of the metal corresponding to each metal salt. The metal content in the 2-cyanoethyl group-containing polymer can be measured by using ICP (Inductively Coupled Plasma) mass spectrometry. The metal salts include metal salts derived from a staring raw polymer and a neutralized salt produced by the reaction between the catalyst such as caustic soda or sodium carbonate and an acid, which is added at the last stage of the reaction as a reaction terminator. Examples of the metal include Na, Mg, Al, K, Ca, Cr, Fe, Cu, Zn and Pb. When the content of the metal salts is more than 50 ppm in total in terms of the metal, the metal salts in the 2-cyanoethyl group-containing polymer may dissolve in an electrolyte solution to lower the mechanical strength of a heat-resistant porous layer in a separator. As a result, the cycle properties of the battery may be impaired. The content of the metal salts can be adjusted to 50 ppm or less by repeatedly washing the crude product of a 2-cyanoethyl group-containing polymer with warm or hot water having temperature of higher than 30° C. and optional repeating of re-dissolution/re-precipitation.

As for a binder for forming a heat-resistant porous layer, the 2-cyanoethyl group-containing polymer may be used alone, or optionally mixed with a binder resin such as ethylene-vinyl acetate copolymer (EVA, containing 20 to 35 mol % of repeating unit derived from vinyl acetate), acrylate copolymer, styrene butadiene rubber (SBR), polyvinyl butyral (PVB), polyvinyl pyrrolidone (PVP), polyurethane, poly(vinylidene fluoride-hexafluoropropylene) copolymer, poly(vinylidene fluoride-trichloroethylene) copolymer, poly (vinylidene fluoride-chlorotrifluoroethylene) copolymer, poly(vinylidene fluoride-hexafluoropropylene) copolymer, poly(vinylidene fluoride-trichloroethylene) copolymer, cellulose acetate, cellulose acetate butyrate or cellulose acetate propionate. When it is mixed with the binder resin, 10 to 1000 parts by weight of the binder resin relatively to 100 pars by weight of the 2-cyanoethyl group-containing polymer can be used.

The inorganic filler is not particularly limited insofar as it has a melting point of 200° C. or more, a high electric insulation, electrochemical stability and stability in an electrolyte solution or a solvent used for slurry for forming the heat-resistant porous layer. Examples of the inorganic filler include particles of inorganic oxides such as iron oxide, $SiO_2$ (silica), $Al_2O_3$ (alumina), $TiO_2$, $BaTiO_3$, ZrO, $PB(Mg_{3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$ and $Y_2O_3$; particles of inorganic nitrides such as aluminum nitride and silicon nitride; particles of poorly soluble ionic crystals such as calcium fluoride, barium fluoride and barium sulfate; particles of covalent crystals such as silicone and diamond; particles of clay such as talc and montmorillonite; a material derived from a mineral such as boehmite, zeolite, apatite, kaolin, mullite, spinel, olivine, sericite and bentonite, or lithium titanium phosphate ($Li_xTi_y(PO_4)_3$, wherein x and y are numbers satisfying $0<x<2$ and $0<y<3$, respectively); and any combination thereof. The particle diameter of the inorganic filler is not particularly limited. The mean particle diameter is preferably from 5 nm to 5 µm, more preferably from 0.01 to 1 µm in view of formation of a heat-resistant porous layer having a uniform thickness and formation of an appropriate void ratio. The mean particle diameter can be measured by a device based on a laser diffraction scattering method. When the mean particle diameter of the inorganic filler is less than 5 nm, dispersibilty of the inorganic filler is lowered so that it may be difficult to control the physical properties of the separator. When it is more than 5 strength of the heat resistant-porous layer is lowered so that the layer becomes brittle and smoothness of the surface tends to get deteriorated. In addition, a heat-resistant porous layer containing the same content of solid particles becomes thicker so that the mechanical properties are lowered.

A method for forming the heat-resistant porous layer is not particularly limited. For example, the heat-resistant porous layer may be formed by coating the porous substrate with a slurry in which an inorganic filler has been dispersed in a solution of a binder in a solvent, and drying for removing the solvent.

The solvent for dissolving the binder is not particularly limited insofar as the binder is dissolved therein. Examples of the solvent include acetone, tetrahydrofuran, cyclohexanone, ethylene glycol monomethyl ether, methyl ethyl ketone, acetonitrile, furfuryl alcohol, tetrahydrofurfuryl alcohol, methyl acetoacetate, nitromethane, N,N-dimethylformamide (DMF), N-methyl-2-pyrrolidone, γ-butyrolactone and propylene carbonate. The solvent may be mixed, for example, in an amount of 300 to 5000 parts by weight relatively to 100 parts by weight of the binder.

As for the method for dispersing an inorganic filler in a binder solution, a known method of using a stirrer, a disperser, a pulverizer or the like can be employed. In particular, a ball mill method is preferable.

A mixture ratio of the inorganic filler to the binder in slurry is not particularly limited. A thickness, an average pore diameter and a porosity of the final product of heat-resistant porous layer can be controlled by the mixture ratio. The inorganic filler content in the heat-resistant porous layer is preferably from 50% by weight to 95% by weight. When the inorganic filler content is less than 50% by weight, a pore portion in the heat resistant-porous layer becomes small so that the battery performance may be deteriorated or sufficient heat resistance may not be obtained. When it is more than 95% by weight, the heat resistant-porous layer may become brittle so that it may be difficult to handle.

The heat-resistant porous layer can have low resistance because the pores ensure a route for ionic conduction. The average pore diameter is not particularly limited insofar as they are large enough for the lithium ions contained in an electrolyte solution described below to pass through. The average pore diameter is preferably 5 nm to 5 µm, particularly preferably 0.1 to 3 µm from the viewpoint of mechanical strength of the heat resistant porous layer. The porosity is preferably 5 to 95%, particularly preferably 20 to 70%. The average pore diameter can be measured by using a mercury intrusion porosimeter. The porosity is calculated based on the following formula, after obtaining true density (d) of an inorganic filler, volume (v) of a heat-resistant porous layer and weight (m) of a heat-resistant porous layer.

$$\text{Porosity (\%)} = \{1 - m/(vd)\} \times 100$$

The heat-resistant porous layer having an average porosity of 5 to 95% and pore diameter of 5 nm to 5 µm can be obtained by controlling the particle diameter of inorganic particles or the weight ratio of inorganic particles to the binder.

According to the invention, the separator of a non-aqueous electrolyte battery comprises a porous substrate and a heat-resistant porous layer comprising an inorganic filler and the binder described above. The heat resistant-porous layer is formed on one or both surfaces of the porous substrate. The inside of the heat-resistant porous layer preferably contains many pores resulting from the voids present among inorganic filler particles. When the heat resistant-porous layer is formed on one surface of the porous substrate, the surface of the porous substrate on which the heat resistant-porous layer is formed may be on a positive electrode side or a negative electrode side.

The porous substrate is not particularly limited and may be a thermoplastic resin which can melt to close the pores in the porous substrate and block ion movement so that an electric current can stop and excess heat or ignition of the battery can be suppressed, for example, when the temperature becomes higher than a certain limit. Examples of the porous substrate include substrates of polyolefins such as low density polyethylene, high density polyethylene, ultra high molecular weight polyethylene and polypropylene; polyesters such as polyethylene terephthalate and polybutylene terephthalate; polyacetal; polyamide; polycarbonate; polyimide; polyether ether ketone; polyether sulfone; and any combination of thereof.

The porous substrate is preferably a film. Although the thickness of the porous substrate is not particularly limited, it is preferably 2 to 50 μm. When it is less than 2 μm, the mechanical properties may not be maintained. When it is more than 50 μm, it may function as a resistant layer. Although the average pore diameter and the porosity of the porous substrate are not particularly limited, the average pore diameter is preferably 0.1 to 30 μm and the porosity is preferably 10 to 90%. The porosity means the volume ratio of pores in a porous substrate. When the average pore diameter is less than 0.1 μm and the porosity is less than 10%, ion conductivity may be lowered. When the average pore diameter is more than 30 μm and the porosity is higher than 90%, the mechanical strength may be lowered so that the function as a substrate may not be attained. The average pore diameter can be measured in the same manner as that for the heat-resistant porous layer. The porosity is calculated based on the following formula, after obtaining true density (d) of a porous substrate, volume (v) of a porous substrate, and weight (m) of a porous substrate.

Porosity (%)={1−$m/(vd)$}×100

A method of coating the porous substrate with the slurry includes a coating method commonly used in the art, and is not particularly limited insofar as a desirable film and coating area can be achieved. Examples of the method include a gravure coater method, a reverse roll coater method, a transfer roll coater method, a kiss coater method, a dipping coater method, a knife coater method, an air doctor coater method, a blade coater method, a rod coater method, a squeeze coater method, a cast coater method, a die coater method, a screen printing method and a spray coating method.

According to the invention, the total thickness of the separator which is thus obtained is not particularly limited and can be adjusted in consideration of the battery performance. It is preferably in the range of 2 to 55 μm from the viewpoint of ensuring separation between a positive electrode and a negative electrode.

According to the invention, the non-aqueous electrolyte battery comprises a positive electrode, a negative electrode, the separator described above and an electrolyte solution. More specifically, the separator placed between a positive electrode and a negative electrode is immersed in an electrolyte solution to produce a non-aqueous electrolyte battery. A separator comprising a heat-resistant porous layer formed on a surface of a porous substrate may be placed in such a manner that a surface of the heat-resistant porous layer side faces any side of the positive electrode and negative electrode. According to the invention, preferred examples of the non-aqueous electrolyte battery include a lithium secondary battery such as a lithium metal secondary battery, a lithium ion secondary battery, a lithium polymer secondary battery, or a lithium ion polymer secondary battery.

According to the invention, the electrode which can be used with the separator is generally produced by coating an electrode current collector with a dispersion of an electrode active material and an electroconductive aid in a binder solution.

A positive electrode active material can include a lithium-containing transition metal oxide having a layer structure, typified by the chemical formula of $Li_{1+x}MO_2$ wherein $-0.1<x<0.1$ and M is Co, Ni, Mn, Al, Mg, Zr, Ti, Sn or the like; a lithium manganese oxide having a spinel structure such as $LiMn_2O_4$ or a composition having part of the elements in $LiMn_2O_4$ substituted with one or more of the other elements; and an olivine type compound represented by $LiMPO_4$ wherein M is Co, Ni, Mn, Fe or the like. Specific examples of the lithium-containing transition metal oxide having a layer structure include $LiCoO_2$, $LiNi_{1-x}Co_{x-y}Al_yO_2$ wherein $0.1<x<0.3$ and $0.01<y<0.2$, and an oxide containing at least Co, Ni and Mn such as $LiMn_{1/3}Ni_{1/3}Co_{1/3}O_2$, $LiMn_{5/12}Ni_{5/12}Co_{1/6}O_2$ and $LiNi_{3/5}Mn_{1/5}Co_{1/5}O_2$.

A negative electrode active material includes a lithium metal, a lithium alloy such as lithium aluminum alloy, a carbonaceous material which can store and release lithium, graphite, cokes such as a phenol resin and a furan resin, carbon fibers, glass-like carbon, pyrolytic carbon and active carbon.

A positive electrode current collector includes aluminum foil, nickel foil, and foil made of combination of aluminum and nickel. A negative electrode current collector includes copper foil, gold foil, nickel foil, copper alloy foil, and foil made of a combination of two or more selected from copper, gold, nickel and copper alloy.

An electroconductive aid which can be used for producing an electrode by using the electrode active material includes carbon black such as acetylene black and ketjen black, metal fibers such as aluminum fibers and nickel fibers, natural graphite, heat-expanding graphite, carbon fibers, ruthenium oxide and titanium oxide. Among these, acetylene black or ketjen black is preferable as it can provide desired conductivity with addition of a small amount thereof.

A binder which can be used with the electroconductive aid can include various known binders. Examples of the binder include polytetrafluoroethylene, polyvinylidene fluoride, carboxymethyl cellulose, a cross-linked polymer of fluoroolefin copolymers, styrene-butadiene copolymer, polyacrylonitrile and polyvinyl alcohol. The binder may be dissolved in a solvent and used. Examples of the solvent include N-methyl-2-pyrrolidone (NMP).

As for the electrolyte solution, a solution in which a lithium salt is dissolved in an organic solvent can be used. The lithium salt is not particularly limited insofar as it dissociates in a solvent to form a $Li^+$ ion and does not easily cause a side reaction such as decomposition within the voltage range in which the battery is used. Examples of the lithium salt include an inorganic lithium salt such as $LiClO_4$, $LiPF_6$, $LiBF_4$, $LiAsF_6$, and $LiSbF_6$, and an organolithium salt such as $LiCF_3SO_3$, $LiCF_3CO_2$, $Li_2C_2F_4(SO_3)_2$, $LiN(CF_3SO_2)_2$, $LiC(CF_3SO_2)_3$, $LiCnF_{2n+1}SO_3$ (n≥2), and $LiN(RfOSO_2)_2$ wherein Rf represents a fluoroalkyl group. Preferred examples of the lithium salt include $LiPF_6$, $LiClO_4$, $LiAsF_6$, $LiBF_4$, $LiCF_3SO_3$ and $Li(CF_3SO_2)_2N$.

An organic solvent used for an electrolyte solution is not particularly limited insofar as it can dissolve the lithium salt and does not cause a side reaction such as decomposition within the voltage range in which the battery is used. Examples of the solvent include, but not limited to, cyclic carbonate esters such as propylene carbonate and ethylene carbonate, chain carbonate esters such as ethyl methyl carbonate, diethyl carbonate, dimethyl carbonate and dipropyl carbonate, and a mixture thereof When a mixture of the cyclic carbonate ester and the chain carbonate ester is used, a volume ratio of the cyclic carbonate ester to the chain carbonate ester is preferably from 4:1 to 1:4 from the viewpoint of optimizing the permittivity and viscosity.

According to the invention, a shape of the non-aqueous electrolyte battery can include a prism type or a cylindrical type in which a steel can or an aluminum can is used as a casing (i.e., can casing). Further, it can be a soft package battery in which a laminate film having metal deposited is used as a casing.

Hereafter, specific embodiments of the present invention will be described in detail by way of examples. However, it should not be construed that the present invention is limited to those examples.

EXAMPLES

Synthetic Example 1

The 30 parts by weight of polyvinyl alcohol having a polymerization degree of 1200 were dissolved in 120 parts by weight of water, subjected to an addition of 100 parts by weight of an aqueous 12.5% by weight caustic soda solution, subsequently subjected to additions of 150 parts by weight of acrylonitrile and 120 parts by weight of isopropyl alcohol, and reacted at 30° C. for 5 hours. Next, an aqueous 25% by weight acetic acid solution was added thereto in such an amount that the molar amount of acetic acid added was the same as that of caustic soda added. After neutralization, water was added to the mixture under stirring to allow crude cyanoethyl polyvinyl alcohol to precipitate. The crude cyanoethyl polyvinyl alcohol was washed with 200 parts by weight of warm water having temperature of 50° C. three times, dissolved in 80 parts by weight of acetone, and subjected to an addition of water under stirring to allow the cyanoethyl polyvinyl alcohol to precipitate. The cycle of washing with warm water and re-dissolution/re-precipitation was repeated four times for purification. After drying, cyanoethyl polyvinyl alcohol was obtained.

Synthetic Example 2

Cyanoethyl polyvinyl alcohol was obtained in the same manner as in Synthetic Example 1 except that 120 parts by weight of acrylonitrile was used.

Synthetic Example 3

Cyanoethyl polyvinyl alcohol was obtained in the same manner as in Synthetic Example 1 except that polyvinyl alcohol having a polymerization degree of 1000 was used.

Synthetic Example 4

Cyanoethyl polyvinyl alcohol was obtained in the same manner as in Synthetic Example 1 except that polyvinyl alcohol having a polymerization degree of 1400 was used.

Synthetic Example 5

Cyanoethyl polyvinyl alcohol was obtained in the same manner as in Synthetic Example 1 except that polyvinyl alcohol was added to a mixture of water and an aqueous caustic soda solution, dissolved therein, and then subjected to additions of acrylonitrile and isopropyl alcohol.

Synthetic Example 6

Cyanoethyl polyvinyl alcohol was obtained in the same manner as in Synthetic Example 5 except that the cycle of washing with water having temperature of 20° C. and re-dissolution/re-precipitation was repeated twice.

The cyanoethyl polyvinyl alcohol obtained in Synthetic Examples 1 to 6 were subjected to measurements of bis-cyanoethyl ether content, content of metal salts which is content of the corresponding metal equivalent, and a viscosity by the methods below.

The rate of replacement by cyanoethyl groups was obtained based on the nitrogen content obtained by using the Kjeldahl method. The results are shown in Table 1.

(a) Content of bis-cyanoethyl ether

Measurement was based on the gas chromatography analysis.

(b) Content of Metal Salts which is Content of the Corresponding Metal Equivalent Total content of Na, Mg, Al, K, Ca, Cr, Fe, Cu, Zn and Pb was obtained by using ICP mass spectrometer (manufactured by Shimadzu Corporation).

(c) Viscosity

Viscosity of a solution in which the polymer had been dissolved at the concentration of 20% by weight in dimethylformamide was measured at 20° C. by using Type B Viscometer (rotor: No 2, rotor revolution number: 30 rpm, manufactured by Tokyo Keiki K.K.).

TABLE 1

| Sample | Ratio of replacement by cyanoethyl Groups (%) | viscosity (mPa·S) | bis-cyanoethyl ether content (% by weight) | Content of metal salts (represented as content of the corresponding metal equivalents) (ppm) |
|---|---|---|---|---|
| Syn. Ex. 1 | 75.7 | 300 | 0.23 | 5.8 |
| Syn. Ex. 2 | 61.3 | 270 | 0.32 | 7.2 |
| Syn. Ex. 3 | 71.5 | 220 | 0.21 | 4.8 |
| Syn. Ex. 4 | 73.5 | 380 | 0.38 | 7.1 |
| Syn. Ex. 5 | 26.6 | 187 | 0.60 | 20.2 |
| Syn. Ex. 6 | 28.4 | 154 | 0.82 | 63.4 |

Example 1

Production of Battery

The positive and negative electrodes which had been obtained in the method described below were wound together in whirlpool form while a separator is interposed therebetween to produce a winding electrode body. The resulting winding electrode body was flattened into a flat shape and placed in an aluminum can casing. After injection of a 1 mol/L electrolyte solution of lithium phosphate hexafluoride (LiPF$_6$) in a mixed solvent of ethylene carbonate and ethyl methyl carbonate (volume ratio of 2:1), the can casing was sealed to produce a lithium ion secondary battery.

(a) Production of Separator

The 40 parts by weight of Al$_2$O$_3$ (alumina) was added to the solution obtained by dissolving 10 parts by weight of cyanoethyl polyvinyl alcohol obtained in Synthetic Example 1 in 190 parts by weight of methyl ethyl ketone, and mixed using a ball mill to prepare a slurry. Both surfaces of a polyethylene porous film having a thickness of 16 μm and a porosity (void ratio) of 40% were coated with the slurry prepared by using a dip coating method and dried to produce a separator. The thickness of the heat-resistant porous film was 5 μm after drying. The heat-resistant porous layer in the separator has an average pore diameter of 0.6 μm and a porosity of 65%. The average pore diameter was measured by using a mercury intrusion porosimeter (produced by Quantachrome Instruments). After obtaining the true density of the inorganic filler, volume of the heat-resistant porous layer and weight of the heat resistant porous layer, the porosity was calculated based on the formula described above. The true density of the inorganic filler was measured by using a device for measuring true density (produced by Seishin Kigyo Co., Ltd.).

(b) Production of Positive Electrode

The 85 parts by weight of lithium cobalt oxide ($LiCoO_2$) as a positive electrode active material, 10 parts by weight of acetylene black as an electroconductive aid, and 5 parts by weight of polyvinylidene fluoride (PVDF) as a binder were homogeneously mixed in 100 parts by weight of N-methyl-2-pyrrolidone (NMP) as a solvent to prepare a paste containing a positive electrode mix. Both surfaces of a current collector having a thickness of 15 μm were coated with the resulting paste containing a positive electrode mix. The current collector was made of an aluminum foil. After drying and calendaring, a positive electrode having a total thickness of 150 μm was produced. Further, an aluminum tab was welded on an exposed area of the positive electrode aluminum foil to form a lead portion.

(c) Production of Negative Electrode

The 95 parts by weight of graphite as a negative electrode active material and 5 parts by weight of PVDF as a binder were homogeneously mixed in 100 parts by weight of NMP as a solvent to prepare a paste containing a negative electrode mix. Both surfaces of a current collector having a thickness of 10 μm were coated with the resulting paste containing a negative electrode mix. The current collector was made of a copper foil. After drying and calendaring, a negative electrode having a total thickness of 142 μm was produced. Further, a nickel tab was welded on an exposed area of the negative electrode copper foil to form a lead portion.

Example 2

The lithium ion secondary battery was produced in the same manner as in Example 1 except that the separator was produced by using a mixture of 5 parts by weight of cyanoethyl polyvinyl alcohol of Synthetic Example 1 and 5 parts by weight of poly(vinylidene fluoride-chlorotrifluoroethylene) copolymer instead of the 10 parts by weight of cyanoethyl polyvinyl alcohol of Synthetic Example 1. The heat-resistant porous layer in the separator had an average pore diameter of 0.4 μm and a porosity of 55%.

Example 3

The lithium ion secondary battery was produced in the same manner as in Example 1 except that a solution in which $LiPF_6$ had been dissolved at the concentration of 1 mol/l in a mixed solvent of ethylene carbonate, ethyl methyl carbonate and diethyl carbonate at a volume ratio of 1:2:1 was used as an electrolyte solution. The heat-resistant porous layer in the separator had an average pore diameter of 0.3 μm and a porosity of 63%.

Example 4

The lithium ion secondary battery was produced in the same manner as in Example 1 except that the separator was produced by using a polyethylene terephthalate porous film having a thickness of 20 μm and a porosity (void ratio) of 70% instead of the polyethylene porous film, and using aluminum nitride instead of the $Al_2O_3$ (alumina). The heat-resistant porous layer in the separator had an average pore diameter of 0.5 μm and a porosity of 65%.

Example 5

The lithium ion secondary battery was produced in the same manner as in Example 1 except that the separator was produced by using the cyanoethyl polyvinyl alcohol of Synthetic Example 2. The heat-resistant porous layer in the separator had an average pore diameter of 1.3 μm and a porosity of 58%.

Example 6

The lithium ion secondary battery was produced in the same manner as in Example 1 except that the separator was produced by using the cyanoethyl polyvinyl alcohol of Synthetic Example 3. The heat-resistant porous layer in the separator had an average pore diameter of 0.2 μm and a porosity of 45%.

Example 7

The lithium ion secondary battery was produced in the same manner as in Example 1 except that the separator was produced by using the cyanoethyl polyvinyl alcohol of Synthetic Example 4. The heat-resistant porous layer in the separator had an average pore diameter of 0.8 μm and a porosity of 62%.

Comparative Example 1

The lithium ion secondary battery was produced in the same manner as in Example 1 except that the separator was produced by using the cyanoethyl polyvinyl alcohol of Synthetic Example 5. The heat-resistant porous layer in the separator had an average pore diameter of 0.6 μm and a porosity of 48%.

Comparative example 2

The lithium ion secondary battery was produced in the same manner as in Example 1 except that the separator was produced by using the cyanoethyl polyvinyl alcohol of Synthetic Example 6. The heat-resistant porous layer in the separator had an average pore diameter of 0.4 μm and a porosity of 64%.

<Evaluation of Battery>

(a) Evaluation of Heat Resistance

The lithium ion secondary batteries produced above were left to stand at 150° C. for 1 hour and at 180° C. for 1 hour, and then examined. The batteries operated normally were evaluated as "good" and the batteries not operated normally owing to short circuit were evaluated as "poor". The results are shown in Table 2. Every battery of Examples 1 to 7 operated normally. However, after the batteries of Comparative Examples 1 and 2 were left to stand at 180° C. for 1 hour, they did not operate normally due to short circuit. It is considered that since heat resistance of the heat-resistant porous layer comprised by each of the batteries of Comparative Examples 1 and 2 was insufficient, the polyethylene porous film reached high temperature so that it melted and shrank to cause internal short circuit.

(b) Evaluation of Load Characteristics

Each of the lithium ion secondary batteries produced above was subjected to constant current-constant voltage charging in which the battery was charged by a constant current of 0.2

C until the battery voltage reached 4.2 V, and then charged by a constant voltage of 4.2 V. Total charging time until the completion of the charging was 15 hours. After charged, each battery was discharged at a discharge current of 0.2 C until the battery voltage reached 3.0 V and then discharge capacity (i.e., 0.2 C discharge capacity) was measured. Further, each battery was charged under the same condition as above, and then discharged at a discharge current of 2 C until the battery voltage reached 3.0 V and then discharge capacity (i.e., 2 C discharge capacity) was measured. The ratio of 2 C discharge capacity to 0.2 C discharge capacity (i.e., load characteristics) was examined for each battery. The charging and discharging were carried out in an ambient temperature of 20° C. The results are shown in Table 2. The lithium ion secondary batteries produced in Examples 1 to 7 exhibited the high load characteristics of more than 85%. It is considered that since the separator comprised a binder comprising cyanoethyl polyvinyl alcohol having high permittivity and low content of bis-cyanoethyl ether, the ion conductivity was good and voltage reduction caused by internal resistance was suppressed. On the other hand, the lithium ion secondary batteries produced in Comparative Examples 1 to 2 exhibited relatively low load characteristics of 75% or less. It is considered that since the separator used for each of the batteries of Comparative Examples 1 to 2 comprised a binder comprising cyanoethyl polyvinyl alcohol having low permittivity and high content of bis-cyanoethyl ether, the ion conductivity was poor and the load characteristics were impaired.

(c) Evaluation of Cycle Characteristics

The lithium ion secondary batteries were subjected to 100 cycles of charge and discharge by using a charge/discharge testing device (HJ-101SM6, manufactured by Hokuto Denko Corporation). With respect to the charge and discharge, the battery was charged at 1.6 mA/h until the battery voltage reached 4.2 V and discharged at 1.6 mA/h until the battery voltage reached 2.75 V. Then, based on the discharge capacity at the 1st cycle and the discharge capacity at the 100th cycle, the cycle characteristics were calculated in accordance with the following formula.

Cycle characteristics (%)={(Discharge capacity at 100th cycle)/(Discharge capacity at 1st cycle)}×100

When the cycle characteristics were 80% or more, they were evaluated as "good", while when the cycle characteristics were less than 80%, they were evaluated as as "poor". The cycle characteristics of the lithium ion secondary batteries produced in Examples 1 to 7 and Comparative Example 1 were 80% or more and evaluated as "good". Although the reason remains unclear, it is considered that since the binder comprising cyanoethyl polyvinyl alcohol with low content of metal salts was used for the separator, materials derived from the metal salts and being present in the electrolyte solution and/or between the electrodes, did not grow on the electrodes. On the other hand, the lithium ion secondary battery produced in Comparative Example 2 exhibited poor cycle characteristics of less than 80%. It might be possibly owing to the fact that in Comparative Example 1, the binder comprising cyanoethyl polyvinyl alcohol having high content of metal salts was used for the separator of the lithium ion secondary battery.

TABLE 2

| | Heat resistance *1 | | Load characteristics (%) | Cycle characteristics |
|---|---|---|---|---|
| | 150° C. for 1 hour | 180° C. for 1 hour | | |
| Example 1 | good | good | 91 | good |
| Example 2 | good | good | 92 | good |
| Example 3 | good | good | 91 | good |
| Example 4 | good | good | 89 | good |
| Example 5 | good | good | 90 | good |
| Example 6 | good | good | 87 | good |
| Example 7 | good | good | 91 | good |
| Comp. Ex. 1 | good | poor | 75 | good |
| Comp. Ex. 2 | good | poor | 68 | poor |

*1 "good" means that the battery operated normally, while "poor" means that the battery did not operate normally owing to short circuit.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed.

The invention claimed is:

1. A separator for a non-aqueous electrolyte battery, the separator comprising:
    a porous substrate and a heat-resistant porous layer comprising an inorganic filler and a binder comprising a 2-cyanoethyl group-containing polymer having bis-cyanoethyl ether content of 0.2% to 0.5% by weight or-less as an impurity,
    wherein content of metal salts present in the 2-cyanoethyl group-containing polymer is 50 ppm or less in terms of metal.

2. The separator according to claim 1, wherein the 2-cyanoethyl group-containing polymer is cyanoethyl polyvinyl alcohol.

3. The separator according to claim 1, wherein the porous substrate is a substrate of polyolefin, polyester, polyacetal, polyamide, polycarbonate, polyimide, polyether ether ketone, polyether sulfone, or any combination thereof.

4. The separator according to claim 3, wherein the inorganic filler is selected from a group consisting of inorganic oxides, inorganic nitrides, poorly soluble ionic crystals, covalent crystals, clay, a material derived from a mineral, lithium titanium phosphate represented by $Li_xTi_y(PO_4)_3$ wherein x and y are numbers satisfying $0 \leq x \leq 2$ and $0 \leq y \leq 3$, respectively, and any combination thereof.

5. A non-aqueous electrolyte battery comprising a positive electrode, a negative electrode, the separator of claim 1 and an electrolyte solution.

6. The non-aqueous electrolyte battery according to claim 5, wherein the electrolyte solution comprises cyclic carbonate ester selected from the group consisting of ethylene carbonate and propylene carbonate; chain carbonate ester selected from the group consisting of dimethyl carbonate, ethyl methyl carbonate and diethyl carbonate; and a lithium salt.

7. A non-aqueous electrolyte battery comprising a positive electrode, a negative electrode, the separator of claim 4 and an electrolyte solution.

8. The non-aqueous electrolyte battery according to claim 7, wherein the electrolyte solution comprises cyclic carbonate ester selected from the group consisting of ethylene carbonate and propylene carbonate; chain carbonate ester selected from the group consisting of dimethyl carbonate, ethyl methyl carbonate and diethyl carbonate; and a lithium salt.

* * * * *

UNITED STATES PATENT AND TRADEMARK OFFICE
CERTIFICATE OF CORRECTION

PATENT NO. : 8,771,880 B2
APPLICATION NO. : 13/430818
DATED : July 8, 2014
INVENTOR(S) : Fukui et al.

It is certified that error appears in the above-identified patent and that said Letters Patent is hereby corrected as shown below:

In the Claims:
Column 14, Claim 4, Line 44:
  Please correct "$0 \leq x \leq 2$ and $0 \leq y \leq 3$," to read -- $0 < x < 2$ and $0 < y < 3$, --

Signed and Sealed this
Twenty-seventh Day of January, 2015

Michelle K. Lee
*Deputy Director of the United States Patent and Trademark Office*